United States Patent [19]

Del Rico

[11] 4,196,509
[45] Apr. 8, 1980

[54] ASSEMBLY APPARATUS FOR ELECTRICAL CONNECTORS

[75] Inventor: Herencia R. Del Rico, Orange, Calif.

[73] Assignee: International Telephone and Telegraph Corporation, New York, N.Y.

[21] Appl. No.: 945,467

[22] Filed: Sep. 25, 1978

[51] Int. Cl.² ............................................. H01R 43/00
[52] U.S. Cl. ..................................... 29/747; 264/272; 29/845
[58] Field of Search ....................... 29/629, 747, 761; 264/272; 339/218 M, 218 R

[56] References Cited

U.S. PATENT DOCUMENTS

| | | |
|---|---|---|
| 3,345,730 | 10/1967 | Laverty . |
| 3,494,998 | 2/1970 | Anhalt .............................. 264/272 X |
| 4,114,976 | 9/1978 | Selvin et al. ..................... 264/272 X |

Primary Examiner—Francis S. Husar
Assistant Examiner—C. J. Arbes
Attorney, Agent, or Firm—A. Donald Stolzy

[57] ABSTRACT

A machine to assemble electrical contact retention clips automatically in an insulator including a slotted tube expandable by a tapered plunger to embed an electrical connector retention clip in a heated and softened insulator after having been inserted into an insulator bore by a ferrule slidable on the tube.

4 Claims, 16 Drawing Figures

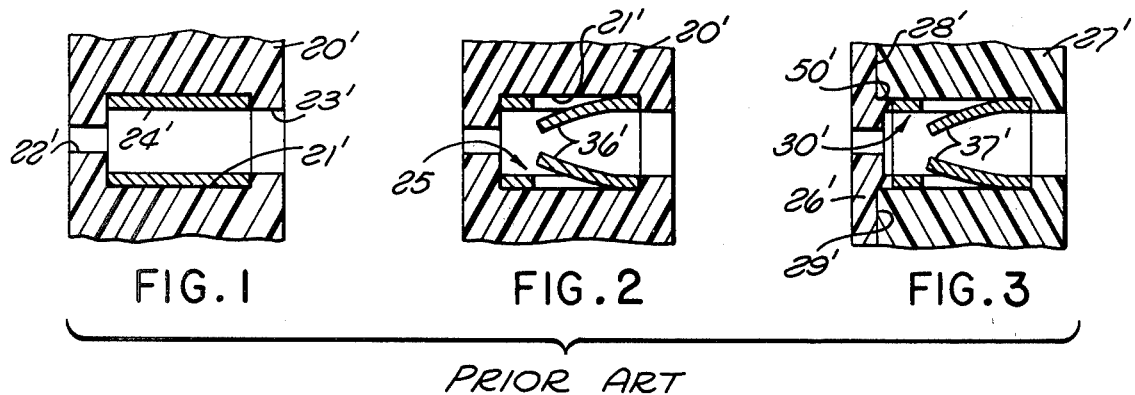
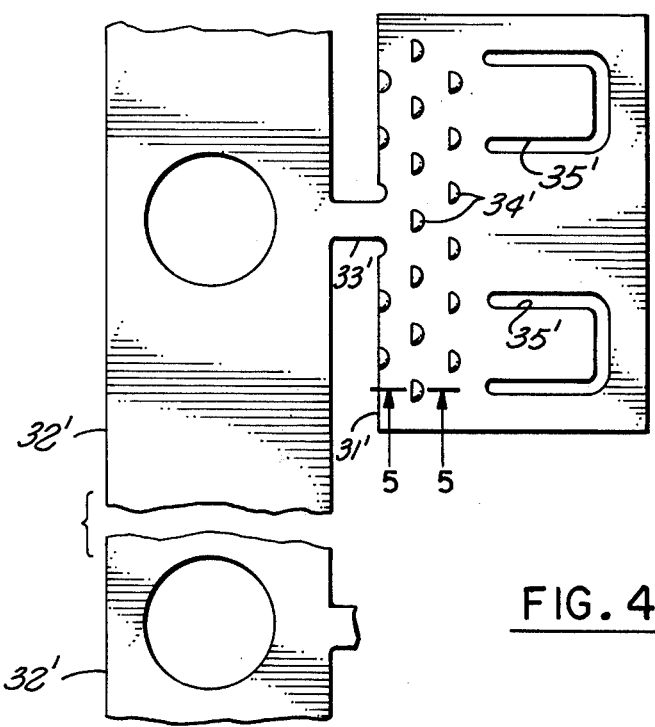
FIG. 4 PRIOR ART
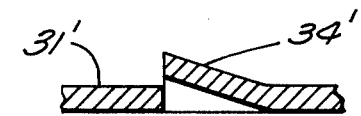
FIG. 5 PRIOR ART

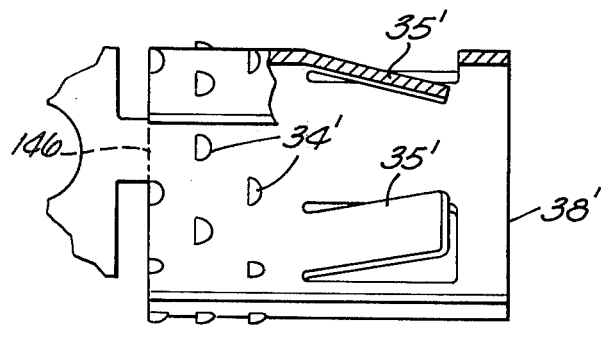
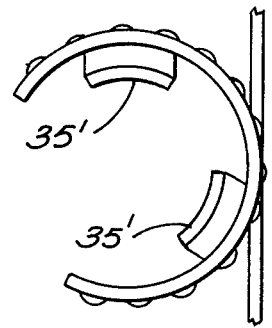
FIG. 6 PRIOR ART          FIG. 7 PRIOR ART
FIG. 16
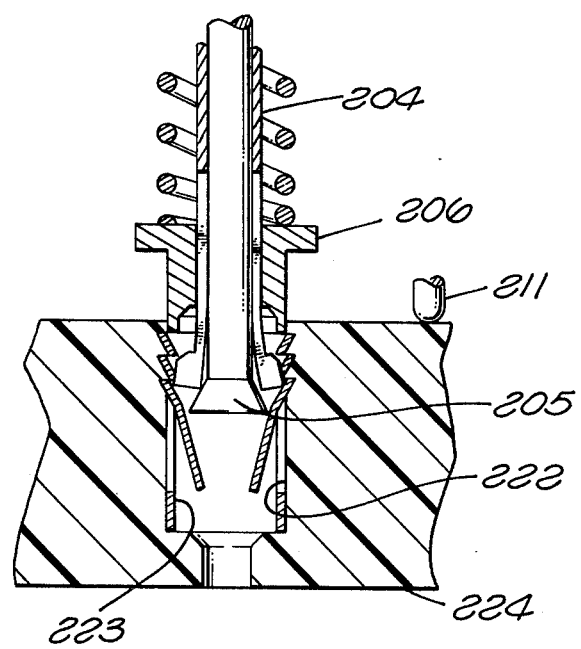

STEP 1: INSTALL CLIP IN CAVITY.

STEP 2: INSERT CLIP, THEN HEAT EITHER OR BOTH OF CLIP AND PROBE BEFORE OR AFTER INSERTION.

STEP 3: EMBED BARBS IN DIELECTRIC UNDER HEAT AND PRESSURE

STEP 4: REMOVE PROBE BARBS RETAIN CLIP IN CAVITY.

ASSEMBLY APPARATUS FOR ELECTRICAL CONNECTORS

BACKGROUND OF THE INVENTION

This invention relates to electrical connectors, and more particularly to a machine for automatically assembling electrical contact retention clips in bores in an insulator.

PRIOR ART STATEMENT

This invention was searched. U.S. Pat. No. 3,345,730 issued Oct. 10, 1967 was cited in this search. This patent discloses a split tube expandable by a tapered plunger to crimp a cylinder around the periphery of a hole through a plate.

SUMMARY OF THE INVENTION

According to the present invention, there is provided an automated assembler for inserting and staking an electrical contact retention clip in a bore in an insulator by heating the insulator until it is soft, inserting the clip, and releasably expanding the clip to cause it to be embedded in the bore.

BRIEF DESCRIPTION OF THE DRAWINGS

In the accompanying drawings which illustrate exemplary embodiments of the present invention:

FIG. 1 is a broken away vertical sectional view through an electrical connector assembly which has been partially constructed in accordance with the prior art;

FIG. 2 is a broken away vertical sectional view of a prior art electrical connector assembly;

FIG. 3 is a broken away vertical sectional view of another prior art electrical connector assembly;

FIG. 4 is a top plan view of a formed blank from which a prior art contact retaining clip is fabricated;

FIG. 5 is a vertical sectional view through a portion of the blank shown in FIG. 4, taken along line 5—5 therein;

FIG. 6 is a broken away view, partly in section, of a clip formed from the blank shown in FIG. 4;

FIG. 7 is a right end elevational view of a contact retaining clip illustrated in FIG. 6;

FIG. 16 is an enlarged sectional view constructed in accordance with the present invention

DESCRIPTION OF THE PREFERRED EMBODIMENT

Figure 8:
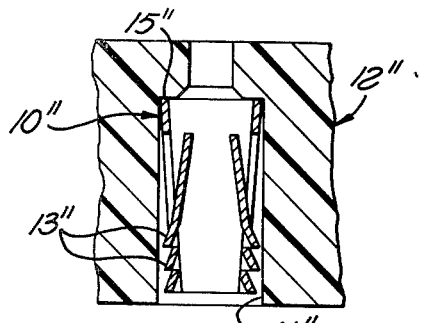
FIGS. 8, 9, 10 and 11 are broken away vertical sectional views of an insulator and a clip similar to that shown in FIG. 6 illustrating prior art steps which may be performed.
Figure 9:
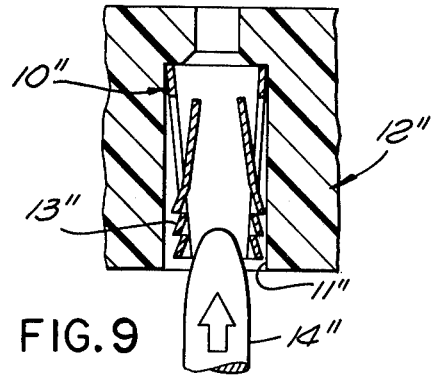
Figure 10:
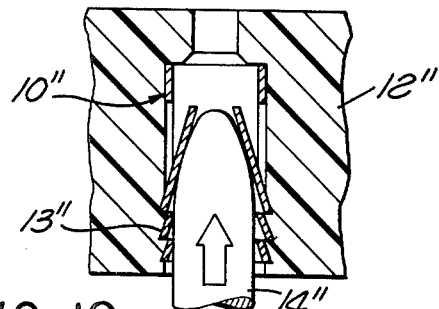

In FIG. 1, a prior art method of fabricating an electrical connector assembly is shown including an insulator 20' having an internal bore 21', and counter bores 22' and 23'. When insulator 20' is molded, an aluminum sleeve 24' is located on a core pin (not shown), and insulator 20' is molded around sleeve 24'. When insulator 20' has been molded around sleeve 24' as shown in FIG. 1, sleeve 24' is removed from bore 21' by etching with an acid. A contact retention clip 25' shown in FIG. 2 is then placed in bore 21'. Clip 25' may be similar to or identical to one of the clips disclosed in U.S. Pat. No. 3,158,424 issued Nov. 24, 1964. Clip 25' releasably retains an electrical connector contact, not shown.

The prior art method of making the electrical connector assembly shown in FIG. 2 is expensive because it is expensive to etch sleeve 24' in FIG. 1, and it is expensive to insert clip 25' in bore 21' shown in FIG. 2.

Another prior art electrical connector assembly is shown in FIG. 3 including two insulators 26' and 27' which may be cemented together along lines 28' and 29'. A clip is provided at 30' which, if desired, may be identical to clip 25'. Insulators 26' and 27' are molded, assembled to clip 20', and cemented together. The electrical connector assembly of the prior art shown in FIG. 3 is expensive to make because it requires two parts, a connecting operation, and thin barriers 50' to avoid voltage breakdown.

The contact retention assembly disclosed in U.S. Pat. No. 3,494,998 issued Feb. 10, 1970, has a construction similar to that illustrated in FIG. 2. However, it has the disadvantage that the rear of the insulator is often uneven so that the pushout forces for the clips are not uniform.

In accordance with the present invention, a conventional blank 31' of resilient sheet metal shown in FIG. 4 may be continually made on a strip 32' and may be connected thereto by means illustrated at 33'. The blank is substantially flat except for barbs 34' shown in FIGS. 4 and 5. The barbs are stamped out of the material of the blank 31' thus leaving small apertures in the blanks, as seen in FIG. 5. The blank embodies leaf spring tines 35' similar to or identical to tines 36' and 37' shown in FIGS. 2 and 3, respectively. The blank 31' is partially formed into a contact retention clip as illustrated at 38' in FIG. 6 having a generally cylindrical configuration.

A one-piece molded insulator body 12" formed of thermally deformable material is employed for mounting clip 38' or a clip 10" similar to or identical to clip 38' as shown in FIGS. 8, 9, 10 and 11 which are shown inverted.

After a clip is loaded into an insulator in accordance with the present invention, it may be heat staked as described herein. See also copending application Ser. No. 788,315 filed Apr. 18, 1977, by G. J. Selvin et al for ELECTRICAL CONNECTOR ASSEMBLY AND METHOD OF MAKING THE SAME assigned to the assignee of the instant application. The said application Ser. No. 788,315 issued into U.S. Pat. No. 4,114,976 on Sept. 19, 1978.

Figure 11:
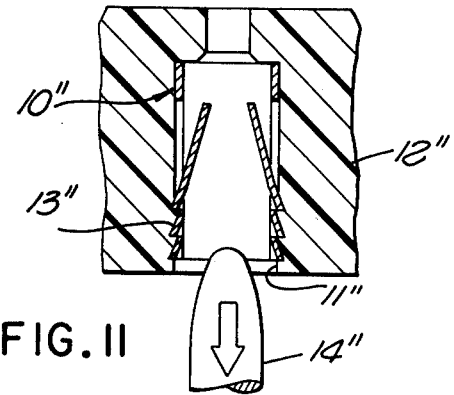

In general, the clip 10" is inserted into a cylindrical bore 11" in an insulator body 12". Preferably, the forward end of the clip 10" abuts a shoulder 15" in the bore 11", as seen in FIG. 8. The clip 10" may have a loose sliding fit in the bore or may frictionally engage the wall of the bore when first inserted therein. The insulator material of body 12" surrounding the bore is heated to a sufficient temperature to cause it to soften and flow under pressure. The clip is caused to expand in the bore so that barbs 13" thereon will become embedded in the softened insulator material as seen in FIG. 11. The softened material totally surrounds the barbs to prevent the possibility of Corona discharge degradation between adjacent clips in the insulator body. When the clip is expanded in the bore, some of the softened insulator material will flow into the small apertures in the clip formed by the stamped out barbs. This will enhance retention of the clip in bore 11" and will prevent moisture from the external environment from leaking through the apertures behind the clip wall. Thus, after loading in accordance with the present invention, by the above-described heat staking operation, the clip is seized by the insulator material to hold the clip firmly against axial movement in bore 11". The insulator material surrounding the bore may be heated by directly heating the entire insulator (as in an oven) or by heating the clip, in which case the insulator material is heated by conduction. The clip 10" and/or body 12" may be heated before insertion of the clip into bore 11" or by induction heating of the clip after insertion, for example.

Preferably, the diameter of the clip in its relaxed or unstressed condition is greater than the diameter of the bore 11" in body 12". In this case, the clip may be stressed into a symmetrical right cylinder to reduce its cross-section in order to insert it into the bore by means to be described. In such a case it may possess relatively high hoop stress when inserted into the bore. If the clip is inserted into the bore warm or hot, or if the insulator is heated to a softened state, the clip will expand to the position shown in FIG. 11 without further operations due to its inherent resiliency.

After the clip is initially inserted into the bore, it simply frictionally engages the wall of the bore. A cylindrical probe 14" is then pushed into the clip. The probe has a diameter larger than the inside diameter of clip 10" when the clip is initially inserted into bore 11". Preferably, the diameter of probe 14" is equal to the diameter of bore 11" less two times the thickness of the wall of the clip (excluding the barbs 13"). The end of the probe is tapered to facilitate its insertion into the clip. Also, preferably probe 14" is heated so that when it is pushed into the clip, heat from the probe will transfer through the clip by conduction to the insulator causing the same to soften. Simultaneously with the probe heating the insulator, the clip is expanded by the probe causing the barbs 13" in the clip to embed into the softened insulator material surrounding bore 11". As stated previously, some insulator material will also be forced into the apertures in clip 10" resulting from the stamped out barbs 13". The probe is then removed from bore 11" and the softened insulation material cools and hardens to seize about the barbs and fixedly retain the clip within the bore.

Figure 15:
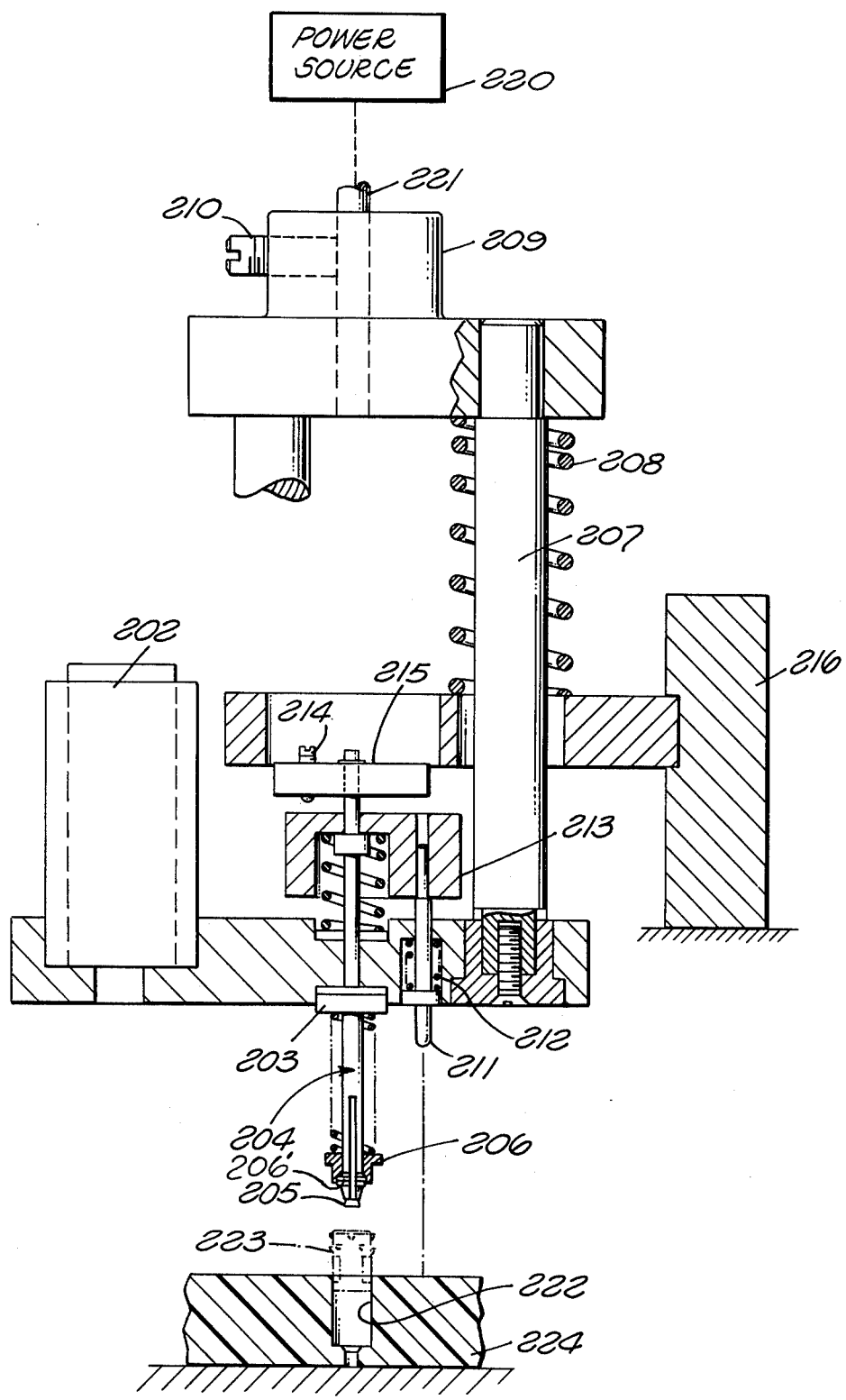
FIG. 15 is a diagrammatic view of the machine of the present invention.

All of the foregoing is made possible by the machine of the present invention illustrated in FIGS. 15 and 16.

Figure 12:
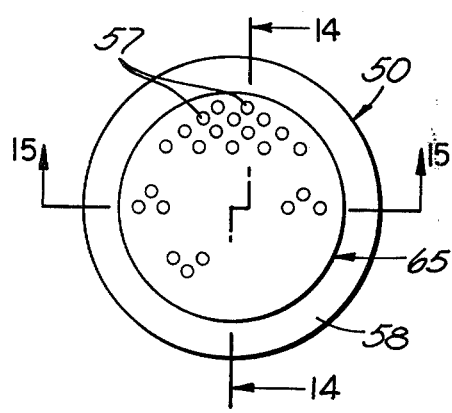
FIG. 12 is a top plan view of an insulator constructed in accordance with the present invention.
Figure 13:
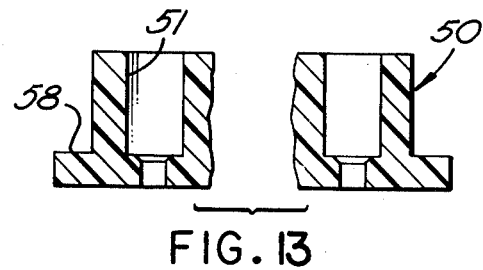
FIG. 13 is a broken vertical sectional view of the insulator shown in FIG. 12.
Figure 14:
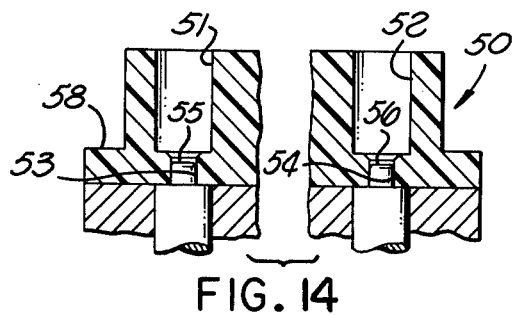
FIG. 14 is a vertical sectional view of the insulator taken on the line 14—14 shown in FIG. 12.

In FIG. 12, an insulator 50 is provided which may be of the type employed with the present invention. Insulator 50 is not different from conventional insulators. Two particularly located bores 51 and 52 are provided therein as shown in FIG. 14 having counterbores 53 and 54, respectively, into which respective pins 55 and 56 are located. Pins 55 and 56 locate insulator 50 relative to a horizontal plane so that clips may be inserted in all the other bores 57 therein shown in FIG. 12, as well as in bores 51 and 52.

DESCRIPTION AND OPERATION OF THE PRESENT INVENTION

In FIG. 15, a base 201 serves as a support and heat transfer body for the entire unit. A heater is provided at 202. Heat passes through the base 201 through a support 203, a sleeve 204 and into a tapered plunger 205. At the same time a ferrule 206 is heated because it surrounds the sleeve 204. Three pillars 207 protrude upward from the base 201. These pillars 207 are encompassed by springs 208 and support a cap 209 with a set screw 210. This set screw 210 is secured to a shaft 221 of a remote, vertical motion device, preferably a pneumatic cylinder 220. A conventional remote triggering device moves the cylinder 220 downwardly and causes the cap 209, pillars 207 and base 201 to move downwardly by sliding against the spring restraint moving through a support 216.

The ferrule 206 and plunger 205 travel downwardly until they come in contact with a manually supplied or otherwise supplied clip over a pre-positioned insulator hole 222. The ferrule 206 will push the clip into the hole 222. A limit switch (not shown) may stop downward movement of plunger 205. However, before this happens, a pin 211 pushes a plate 213 upwardly. This upward motion is transferred to the stop set screws 214 in a plunger cap 215. This causes the plunger 205 to travel upward, and in turn causes the sleeve 204 to expand at the bottom because it is slotted as that of a chuck configuration. The expansion forces the clip into the walls of the surrounding material which has become soft from the pre-heating during the cycle. The insertion of the clip and staking is thus accomplished.

A staking force test could also be accomplished by the same or similar apparatus.

FIG. 16 shows sleeve 204 embedding a clip 223 into an insulator 224.

In FIG. 15, note will be taken that an enlargement 206' is provided on the outside surface or integral with portions of sleeve 204. Thus, ferrule 206 cannot fall below enlargement 206'. Enlargement 206' thus includes stop means to prevent ferrule 206 from sliding on sleeve 204 to a position below that shown on FIG. 15.

I claim:

1. Apparatus for staking an electrical connector contact retention clip in an insulator bore, said apparatus comprising: first means to heat said insulator to cause at least an annular portion of the wall of said bore to soften; a base; reciprocatory means mounted on said base to move said clip in to said bore; (expansion means) carried by said reciprocatory means; and operative means responsive to movement of said reciprocatory means to a predetermined position to cause said expansion means to expand at said annular portion and to cause said clip to expand and to become embedded in the said soft wall portion of said bore.

2. Apparatus for staking an electrical connector contact retention clip in an insulator bore, said apparatus comprising: first means to heat said insulator to cause at least an annular portion of the wall of said bore to soften; a base; reciprocatory means mounted on said base to move into and out of said bore, said reciprocatory means including shaft means and a ferrule slidable on said shaft means and engagable with a clip to insert the same into said bore, said shaft means including a stop means to limit movement of said ferrule on said shaft means; spring means to bias said ferrule against said stop means, said ferrule being engagable with said insulator, said shaft means, after such engagement, moving further relative to said ferrule therethrough; expansion means carried by said shaft means; and operative means responsive to said further movement of said shaft means to a predetermined position to cause said expansion means to expand at said annular portion and to cause said clip to expand and to become embedded in the said soft wall portion of said bore.

3. The invention as defined in claim 2, wherein said shaft means includes a hollow tube having a split portion below said stop, said expansion means including a tapered plunger slidable in said tube, said operative means reciprocating said plunger relative to said tube to expand said split portion of said tube to engage said clip and embed the same as aforesaid responsive to movement means to said predetermined position.

4. Apparatus for staking an electrical connector contact retention clip in an insulator bore, said apparatus comprising: first means to heat said insulator to cause at least an annular portion of the wall of said bore to soften; a base; reciprocatory means mounted on said base to move into and out of said bore, said reciprocatory means including shaft means and a ferrule slidable on said shaft means and engagable with a clip to insert the same into said bore, said shaft means including a stop means to limit movement of said ferrule on said shaft means; spring means to bias said ferrule against said stop means, said ferrule being engagable with said insulator, said shaft means, after such engagement, moving further relative to said ferrule therethrough; expansion means carried by said shaft means; and operative means to cause said expansion means to expand at said annular portion and to cause said clip to expand and to become embedded in the said soft wall portion of said bore.

* * * * *